US011548161B2

(12) United States Patent
Fetzer et al.

(10) Patent No.: US 11,548,161 B2
(45) Date of Patent: Jan. 10, 2023

(54) METHODS OF PERFORMING A PLURALITY OF OPERATIONS WITHIN A REGION OF A PART UTILIZING AN END EFFECTOR OF A ROBOT AND ROBOTS THAT PERFORM THE METHODS

(71) Applicant: The Boeing Company, Chicago, IL (US)

(72) Inventors: Barry Allen Fetzer, Renton, WA (US); Jeong-Beom Ihn, Bellevue, WA (US); Gary E. Georgeson, Tacoma, WA (US); Jill Paisley Bingham, Seattle, WA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 16/874,489

(22) Filed: May 14, 2020

(65) Prior Publication Data

US 2021/0354301 A1    Nov. 18, 2021

(51) Int. Cl.
*G06F 17/00* (2019.01)
*B25J 9/16* (2006.01)
(Continued)

(52) U.S. Cl.
CPC .............. *B25J 9/1697* (2013.01); *B25J 9/041* (2013.01); *B25J 9/1612* (2013.01); *B25J 9/1684* (2013.01);
(Continued)

(58) Field of Classification Search
CPC ........ B25J 9/1697; B25J 9/041; B25J 9/1612; B25J 9/1684; B25J 15/0019; B25J 19/021;
(Continued)

(56) References Cited

U.S. PATENT DOCUMENTS 4,670,653 A    6/1987 McConkle et al.
4,883,971 A    11/1989 Jensen
(Continued)

FOREIGN PATENT DOCUMENTS

EP         2973074 B1 *   4/2019    ......... B23Q 17/2233
WO    WO 2018002871        1/2018

OTHER PUBLICATIONS

Gao et al., The Method of Aiming towards the Normal Direction for Robotic Drilling, International Journal of Precision Engineering And Manufacturing, vol. 18, No. 6, pp. 787-794, Jun. 2017.
(Continued)

*Primary Examiner* — Ronnie M Mancho
(74) *Attorney, Agent, or Firm* — Kolitch Romano Dascenzo Gates LLC

(57) ABSTRACT

Methods of performing a plurality of operations within a region of a part utilizing an end effector of a robot and robots that perform the methods are disclosed herein. The methods include collecting a spatial representation of the part and aligning a predetermined raster scan pattern for movement of the end effector relative to the part with the spatial representation of the part. The methods also include defining a plurality of normality vectors for the part at a plurality of predetermined operation locations for operation of the end effector. The methods further include moving the end effector relative to the part and along the predetermined raster scan pattern. The methods also include orienting the end effector such that an operation device of the end effector faces toward each operation location along a corresponding normality vector and executing a corresponding operation of the plurality of operations with the operation device.

20 Claims, 7 Drawing Sheets

(51) Int. Cl.

| | | |
|---|---|---|
| *B64F 5/60* | (2017.01) | |
| *B64F 5/10* | (2017.01) | |
| *G06T 7/73* | (2017.01) | |
| *G06T 7/33* | (2017.01) | |
| *G06N 20/00* | (2019.01) | |
| *B25J 9/04* | (2006.01) | |
| *B25J 15/00* | (2006.01) | |
| *B25J 19/02* | (2006.01) | |
| *G01B 17/02* | (2006.01) | |
| *G01N 29/24* | (2006.01) | |
| *G01N 29/26* | (2006.01) | |
| *G01N 29/44* | (2006.01) | |
| *G05B 19/4155* | (2006.01) | |
| *G06T 7/00* | (2017.01) | |

(52) U.S. Cl.
CPC ......... *B25J 15/0019* (2013.01); *B25J 19/021* (2013.01); *B64F 5/10* (2017.01); *B64F 5/60* (2017.01); *G01B 17/025* (2013.01); *G01N 29/2418* (2013.01); *G01N 29/26* (2013.01); *G01N 29/4454* (2013.01); *G05B 19/4155* (2013.01); *G06N 20/00* (2019.01); *G06T 7/001* (2013.01); *G06T 7/33* (2017.01); *G06T 7/74* (2017.01); *G05B 2219/50391* (2013.01); *G06T 2207/30164* (2013.01)

(58) Field of Classification Search
CPC . B25J 9/16; B25J 9/1679; B25J 9/1694; B25J 11/00; B64F 5/10; B64F 5/60; G01N 29/2418; G01N 29/26; G01N 29/4454; G01N 29/02; G01N 29/041; G01N 29/2437; G01N 29/2462; G01N 29/34; G05B 19/4155; G05B 2219/50391; G05B 2219/37108; G05B 2219/37208; G05B 2219/37555; G05B 2219/39006; G05B 2219/45066; G05B 2219/49112; G05B 2219/50356; G05B 19/402; G05B 19/401; G06N 20/00; G06T 7/001; G06T 7/33; G06T 7/74; G06T 2207/30164
USPC ....................................................... 700/254
See application file for complete search history.

(56) References Cited

U.S. PATENT DOCUMENTS

| | | | |
|---|---|---|---|
| 6,593,156 B2 | 7/2003 | Nikawa | |
| 7,287,902 B2 | 10/2007 | Safai et al. | |
| 7,312,454 B2 | 12/2007 | Safai et al. | |
| 7,513,964 B2 | 4/2009 | Ritter et al. | |
| 7,553,070 B2 | 6/2009 | Kollgaard et al. | |
| 7,966,883 B2 | 6/2011 | Lorraine et al. | |
| 8,332,165 B1 | 12/2012 | Tat et al. | |
| 8,539,818 B2 | 9/2013 | van Staden | |
| 8,965,100 B2 | 2/2015 | Lin et al. | |
| 9,164,066 B1 | 10/2015 | Bossi et al. | |
| 9,221,506 B1* | 12/2015 | Georgeson | B05D 7/00 |
| 9,334,066 B2 | 5/2016 | Tapia et al. | |
| 9,358,331 B2 | 6/2016 | Fulkerson et al. | |
| 9,383,342 B1 | 7/2016 | Bossi et al. | |
| 9,404,898 B1 | 8/2016 | Georgeson et al. | |
| 9,414,026 B2 | 8/2016 | Blanchard et al. | |
| 9,433,720 B2 | 9/2016 | Updyke et al. | |
| 9,575,033 B1 | 2/2017 | Georgeson et al. | |
| 9,625,423 B2 | 4/2017 | Bossi et al. | |
| 9,645,012 B2 | 5/2017 | Marsh et al. | |
| 9,709,443 B2 | 7/2017 | Holmes et al. | |
| 9,746,445 B2 | 8/2017 | Hafenrichter et al. | |
| 9,796,089 B2* | 10/2017 | Lawrence, III | B25J 9/1697 |
| 9,861,733 B2 | 1/2018 | Burbank et al. | |
| 9,907,897 B2 | 3/2018 | Burbank et al. | |
| 10,035,103 B2 | 7/2018 | Fulkerson et al. | |
| 10,094,794 B2 | 10/2018 | Thompson et al. | |
| 10,126,273 B2 | 11/2018 | Pelivanov et al. | |
| 10,260,953 B2 | 4/2019 | Engelbart et al. | |
| 10,309,893 B2 | 6/2019 | Georgeson et al. | |
| 10,345,267 B2 | 7/2019 | O'Donnell et al. | |
| 10,514,363 B2 | 12/2019 | Ihn et al. | |
| 10,571,390 B2 | 2/2020 | Motzer et al. | |
| 10,690,581 B2 | 6/2020 | Thompson et al. | |
| 11,044,011 B2* | 6/2021 | Georgeson | H04L 41/0695 |
| 11,073,500 B2* | 7/2021 | Bingham | G01N 29/221 |
| 11,131,650 B2 | 9/2021 | Abolmaesumi et al. | |
| 2004/0076216 A1 | 4/2004 | Chamberlain et al. | |
| 2016/0123933 A1 | 5/2016 | Fetzer et al. | |
| 2017/0297198 A1 | 10/2017 | Lawrence, III et al. | |
| 2018/0361571 A1 | 12/2018 | Georgeson et al. | |
| 2019/0300205 A1 | 10/2019 | Georgeson et al. | |
| 2020/0011840 A1* | 1/2020 | Hafenrichter | B62D 63/02 |
| 2020/0015903 A1* | 1/2020 | Scheib | A61B 17/062 |
| 2020/0141908 A1* | 5/2020 | Bingham | G01N 29/265 |
| 2021/0089817 A1* | 3/2021 | Hafenrichter | G06V 10/267 |
| 2021/0090269 A1* | 3/2021 | Troy | G01S 15/8915 |
| 2021/0196385 A1* | 7/2021 | Shelton, IV | A61B 1/00087 |
| 2022/0155795 A1 | 5/2022 | Fetzer et al. | |

OTHER PUBLICATIONS

European Patent Office, Extended European Search Report for related European Patent Application No. 201170172, dated Oct. 18, 2021.

Park et al., *Visualization of hidden delamination and debonding in composites through noncontact laser ultrasonic scanning*, Composites Science and Technology 100, pp. 10-18, 2014.

Liu et al., *Survey: State of the Art in NDE Data Fusion Techniques*, IEEE Transactions on Instrumentation And Measurement, vol. 56, No. 6, Dec. 2007.

\* cited by examiner

METHODS OF PERFORMING A PLURALITY OF OPERATIONS WITHIN A REGION OF A PART UTILIZING AN END EFFECTOR OF A ROBOT AND ROBOTS THAT PERFORM THE METHODS

FIELD

The present disclosure relates generally to methods of performing a plurality of operations within a region of a part utilizing an end effector of a robot and/or to robots that perform the methods.

BACKGROUND

Robots may be utilized to perform a variety of different operations with and/or on a part. As an example, robots may be utilized to assemble one or more components of an aircraft. Historically, robots are effective at performing operations on a part with a well-defined, and quantitatively known, geometry. In such examples, numeric descriptions of the part may be provided to the robot, and the robot may utilize this information to control motion of the robot, locations at which the operations are performed, and the like. Utilizing a robot on parts, or in environments, that are not well-defined and quantitatively known presents unique operational challenges and may increase costs substantially. As an example, it may be necessary to manually train the robot to navigate to various locations on the part and/or to perform desired operations at the various locations. Thus, there exists a need for improved methods of performing a plurality of operations within a region of a part utilizing an end effector of a robot and/or for robots that perform the methods.

SUMMARY

Methods of performing a plurality of operations within a region of a part utilizing an end effector of a robot and robots that perform the methods are disclosed herein. The methods include collecting a spatial representation of the part. The collecting may include collecting with an imaging device that may be associated with the robot. The methods also include aligning a predetermined raster scan pattern for movement of the end effector relative to the part with the spatial representation of the part. The methods further include defining a plurality of normality vectors for the part at a plurality of predetermined operation locations for operation of the end effector. The defining may be based, at least in part, on the spatial representation of the part, and each operation location may be defined along the predetermined raster scan pattern. The methods also include moving the end effector relative to the part and along the predetermined raster scan pattern. The methods further include orienting the end effector such that an operation device of the end effector faces toward each operation location along a corresponding normality vector. The methods also include executing a corresponding operation of the plurality of operations with the operation device and at each operation location.

DESCRIPTION

Figure 1:
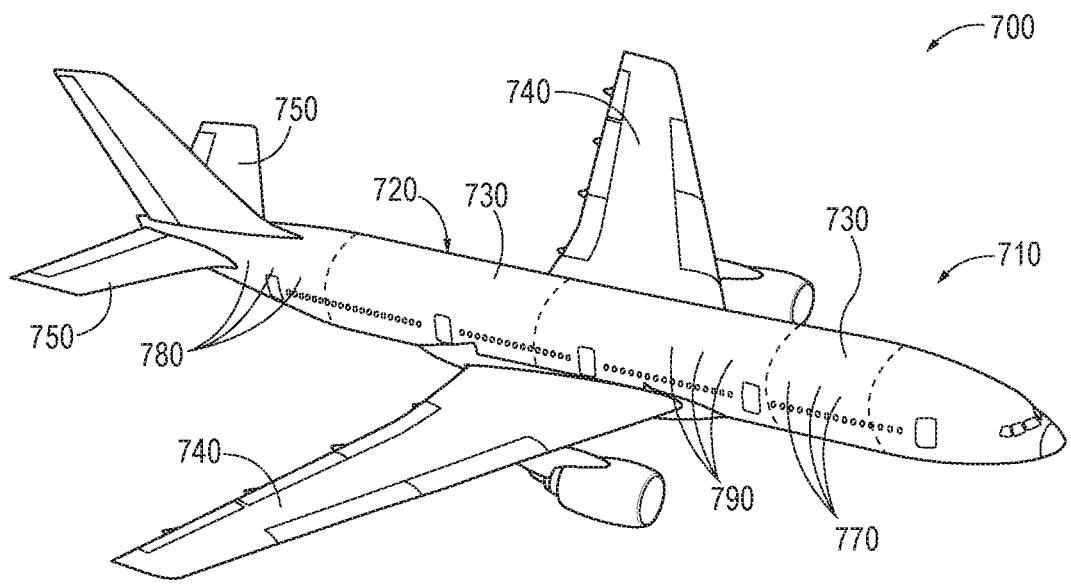
FIG. 1 is a schematic illustration of an example of an aircraft that may be utilized with the robots and methods according to the present disclosure.

FIGS. 1-12 provide illustrative, non-exclusive examples of robots 10 that include end effectors 20 and/or of methods 300, according to the present disclosure. Elements that serve a similar, or at least substantially similar, purpose are labeled with like numbers in each of FIGS. 1-12, and these elements may not be discussed in detail herein with reference to each of FIGS. 1-12. Similarly, all elements may not be labeled in each of FIGS. 1-12, but reference numerals associated therewith may be utilized herein for consistency. Elements, components, and/or features that are discussed herein with reference to one or more of FIGS. 1-12 may be included in and/or utilized with any of FIGS. 1-12 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
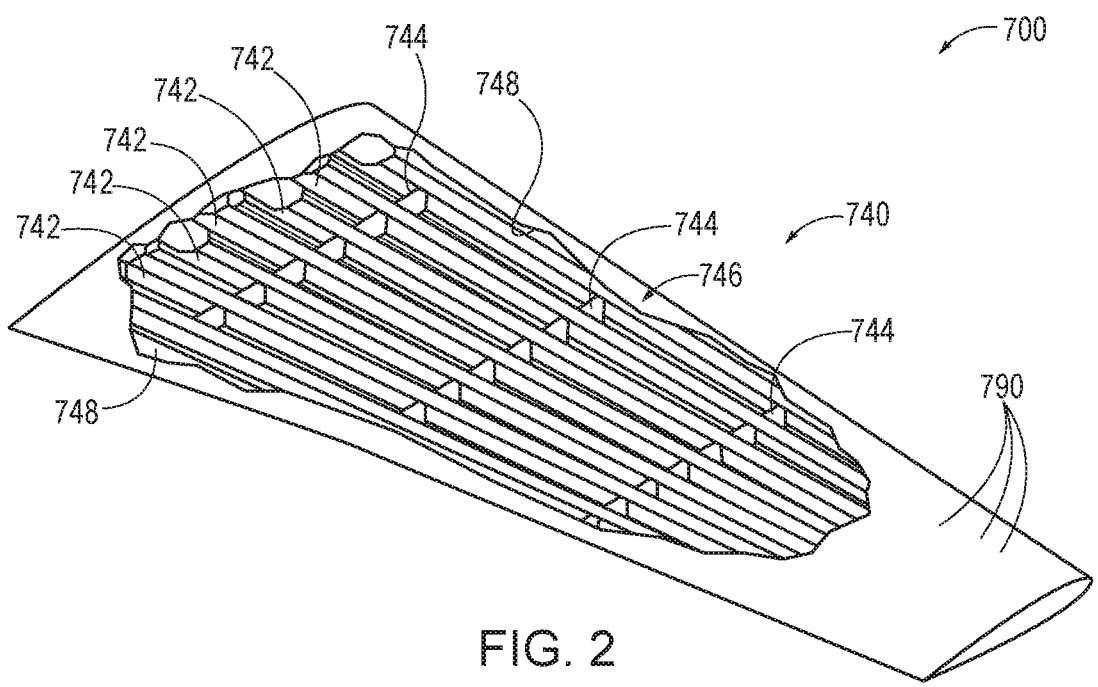
FIG. 2 is a schematic illustration of an example of a wing of an aircraft that may be utilized with the robots and methods according to the present disclosure.
Figure 3:
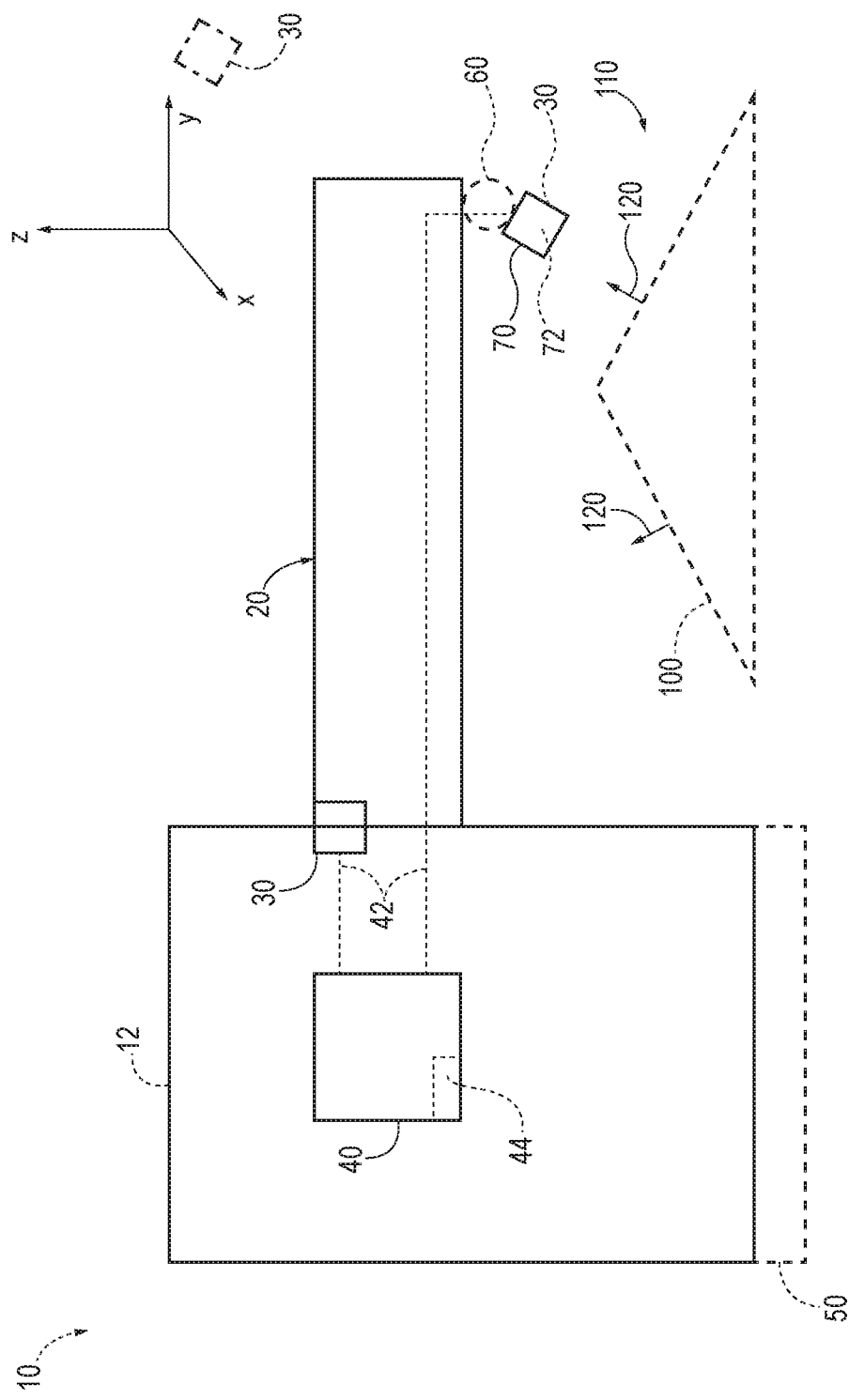
FIG. 3 is a schematic illustration of examples of a robot that may perform methods, according to the present disclosure.

FIG. 1 is a schematic illustration of an example of an aircraft 700 that may be utilized with the robots (such as robot 10 as shown in FIG. 3) and/or methods (such as methods 300 as shown in FIG. 3) according to the present disclosure; and FIG. 2 is a schematic illustration of an example of a wing 740 of an aircraft 700 that may be utilized with the robots and methods according to the present disclosure. As illustrated in FIG. 1, aircraft 700 may include an airframe 710 that includes a fuselage 720, which may be formed from a plurality of fuselage barrel segments 730. As also illustrated in FIG. 1, aircraft 700 may include wings 740 and a stabilizer 750. Aircraft 700 further may include a plurality of skin segments 790, which may be supported by a plurality of stringers 770 and/or frames 780.

Turning to FIG. 2, wings 740 may include a plurality of wing stringers 742 and/or a plurality of ribs, or spars, 744, which may form and/or define an inner support structure 746 thereof. Wings 740 also may include skin segments 790, and an inner surface 748 of skin segments 790 may be attached to and/or supported by inner support structure 746.

During assembly, testing, and/or inspection of aircraft 700, it may be desirable to utilize a robot, such as robots 10, which are discussed in more detail herein, to perform one or more operations on the aircraft. As discussed, conventional robots have required detailed numeric descriptions, such as computer aided drawings, of the aircraft in order to perform such operations and/or have relied upon time-consuming teaching operations to teach the robot how to perform the operations. While effective, such conventional robots also have been costly to implement. In contrast to conventional robots, and as discussed in more detail herein, robots 10 and/or methods 300, according to the present disclosure, may be utilized to perform the one or more operations on the aircraft, or on another part, without the need for such detailed numeric descriptions and/or teaching operations, thereby improving the efficiency of the operations.

FIG. 3 is a schematic illustration of examples of robot 10 that may perform methods 300, according to the present disclosure. As illustrated in solid lines in FIG. 3, robot 10 includes an end effector 20, an imaging device 30, and a controller 40. End effector 20 includes an operation device 70, which may be configured to perform a plurality of operations within a region of a part 100. Imaging device 30 may be configured to collect a spatial representation of part 100. Controller 40 may be configured to control the operation of at least one component of the robot according to methods 300, which are discussed in more detail herein. This may include controlling the operation of robot 10, of end effector 20, and/or of imaging device 30, such as via one or more control signals 42.

As illustrated in dashed lines in FIG. 3, robot 10 may include an actuator 50 and/or end effector 20 may include an actuator 60. Actuator 50 of robot 10, when present, may be configured to move, to operatively translate, and/or to operatively rotate robot 10 relative to part 100, such as during methods 300. Similarly, actuator 60 of end effector 20, when present, may be configured to move, to operatively translate, and/or to rotate at least a subset of end effector 20, such as imaging device 30 and/or operation device 70, relative to part 100. Actuators 50/60 may, for example, be configured to operatively translate corresponding structures along the X, Y, and/or Z-axes of FIG. 3 and/or to rotate the corresponding structures about the X, Y, and/or Z-axes. Examples of actuators 50/60 include any suitable linear actuator, rotary actuator, mechanical actuator, electric actuator, pneumatic actuator, and/or hydraulic actuator.

As illustrated in dashed lines in FIG. 3, operation device 70 may, in some examples, include an inspection device 72. Examples of the inspection device are disclosed herein. Additional examples of operation device 70 and/or of inspection device 72 include a transducer, a sensor, a non-destructive tester, a non-contact inspection device, a painting device, a sanding device, an ultrasound transmitter, an ultrasound receiver, an infrared transmitter, an infrared receiver, and/or an optical imagining device.

Imaging device 30 may be associated with robot 10 in any suitable manner. As an example, and as illustrated in solid lines in FIG. 4, imaging device 30 may be associated with and/or operatively attached to a main body 12 of robot 10 and/or end effector 20. In a specific example, imaging device 30 may be operatively attached to and/or may form a portion of operation device 70. In another specific example, actuator 60 may be configured to move imaging device 30 with operation device 70. As another example, imaging device 30 may be spaced-apart from a remainder of robot 10 and also from part 100, as illustrated in dash-dot lines in FIG. 4. Examples of imaging device 30 include a camera, a still camera, a video camera, an infrared imaging device, a laser-based imaging device, a 3-dimensional camera, and/or an acoustic imaging device.

During operation of robots 10, and as discussed in more detail herein with reference to methods 300, imaging device 30 may collect one or more spatial representations of part 100 and/or of a region 110 of the part. Robot 10 and/or controller 40 thereof then may utilize the one or more spatial representations of part 100 to conform a predetermined raster scan pattern for movement of end effector 20 to the spatial representation of the part. Robot 10 and/or controller 40 additionally or alternatively may define a plurality of normality vectors 120 for the part. The plurality of normality vectors may be based, at least in part, on the spatial representation of the part. Robot 10 then may perform a plurality of operations on the part utilizing operation device 70. The operations may be performed such that operation device 70 faces along a corresponding normality vector 120 at each location where an operation is performed.

Controller 40 may include and/or be any suitable structure, device, and/or devices that may be adapted, configured, designed, constructed, and/or programmed to perform the functions discussed herein. As examples, controller 40 may include one or more of an electronic controller, a dedicated controller, a special-purpose controller, a personal computer, a special-purpose computer, a display device, a logic device, a memory device, and/or a memory device having computer-readable storage media 44.

The computer-readable storage media, when present, also may be referred to herein as non-transitory computer readable storage media. This non-transitory computer readable storage media may include, define, house, and/or store computer-executable instructions, programs, and/or code; and these computer-executable instructions may direct robot 10 and/or controller 40 thereof to perform any suitable portion, or subset, of methods 300. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Figure 4:
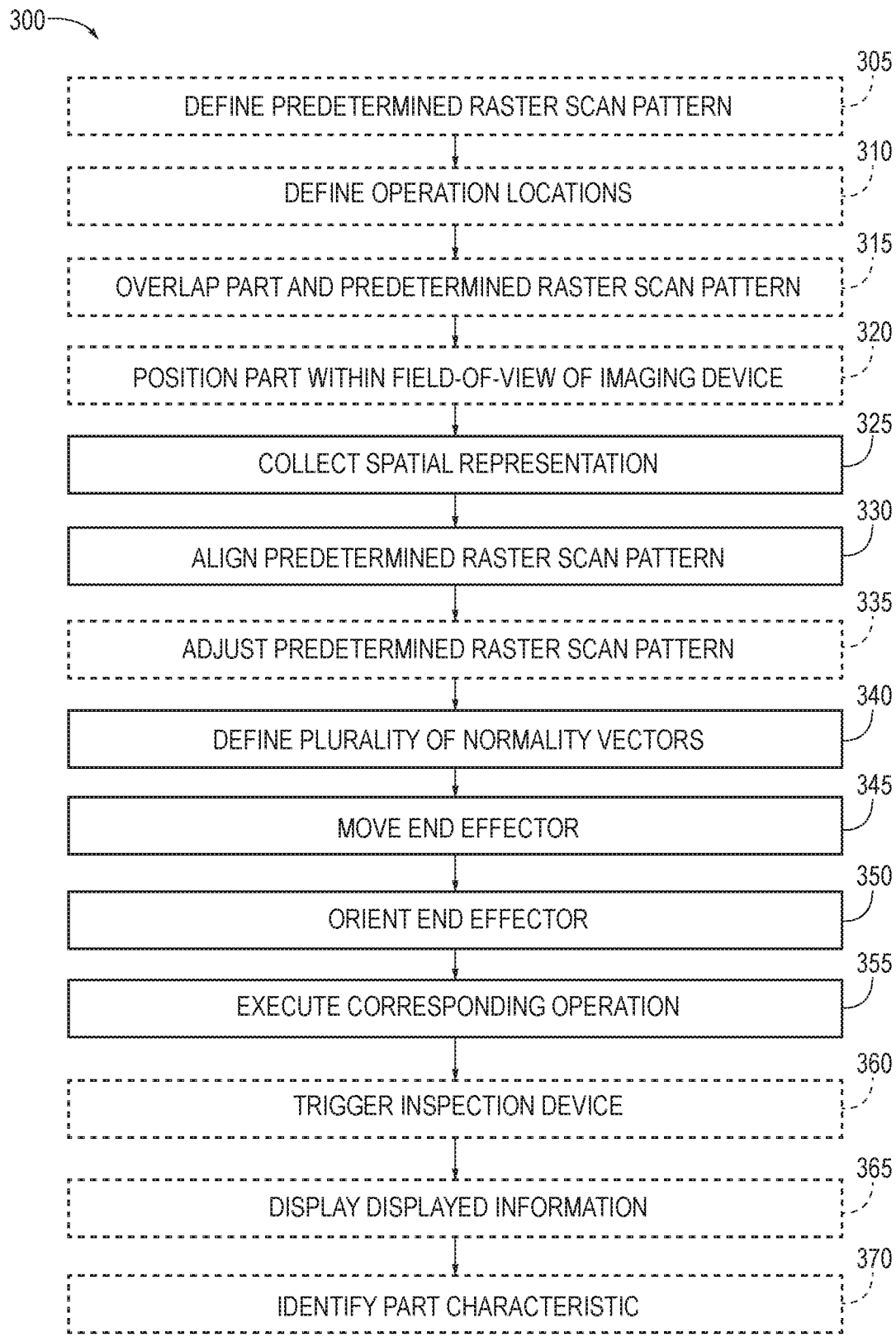
FIG. 4 is flowchart depicting examples of methods of performing a plurality of operations within a region of a part utilizing an end effector of a robot, according to the present disclosure.

FIG. 4 is flowchart depicting examples of methods 300 of performing a plurality of operations within a region of a part utilizing an end effector of a robot, according to the present disclosure. FIGS. 5-12 illustrate various process steps that may be performed by robots 10 and/or during methods 300, according to the present disclosure. Methods 300 may include defining a predetermined raster scan pattern at 305, defining operation locations at 310, and/or overlapping a part and the predetermined raster scan pattern at 315.

Methods 300 also may include positioning the part within a field-of-view of an imaging device at 320 and include collecting a spatial representation of the part at 325. Methods 300 further include aligning the predetermined raster scan pattern at 330, may include adjusting the predetermined raster scan pattern at 335, and include defining a plurality of normality vectors at 340 and moving an end effector at 345. Methods 300 also include orienting the end effector at 350 and executing a corresponding operation at 355 and may include triggering an inspection device at 360, displaying displayed information at 365, and/or identifying a part characteristic at 370.

Defining the predetermined raster scan pattern at 305 may include defining any suitable predetermined raster scan pattern along which the end effector will be moved during the moving at 345. In some examples, the defining at 305 may include defining the predetermined raster scan pattern without, or independent from, any dimensional information of the part. Stated another way, the defining at 305 may include defining the predetermined raster scan pattern without prior knowledge of the part and/or without prior knowledge of the part's dimensions. Such a configuration may be beneficial, for example, when methods 300 are performed on older parts, such as older aircraft, for which detailed dimensional information may not readily be available.

In some examples, the defining at 305 may include defining the predetermined raster scan pattern based on rough measurements of the part and/or rough measurements of a desired size for the region of the part within which methods 300 will be performed. As more specific examples, the defining at 305 may include defining the predetermined raster scan patter based, at least in part, or based solely, upon a length of the region of the part, a width of the region of the part, a length of the part, a width of the part, one or more internal dimensions of the part, and/or one or more external dimensions of the part.

In some examples, and while not required, detailed dimensional information for the part readily may be available. Examples of such detailed dimensional information include numerical descriptions of the part, such as computer-aided design (CAD) and/or computer-aided manufacturing (CAM) drawings of the part. In such examples, the defining at 305 may include defining the predetermined raster scan pattern based, at least in part, on the detailed dimensional information for the part.

Figure 5:
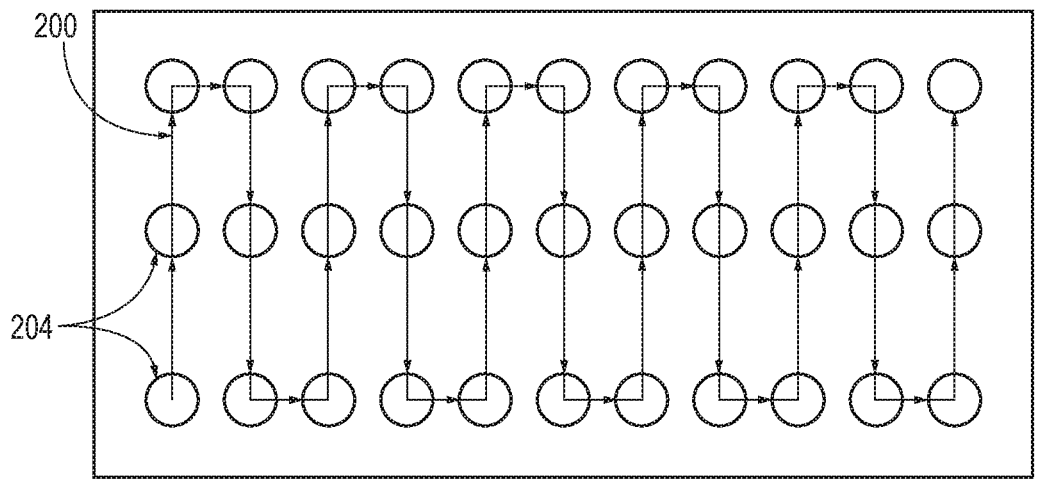
FIG. 5 is a schematic illustration of an example of a predetermined raster scan patter according to the present disclosure.

An example of the predetermined raster scan pattern is illustrated in FIG. 5 and indicated at 200. As illustrated, the predetermined raster scan pattern may include and/or may be defined by a plurality of point-to-point moves that progress, in a raster scan pattern, among a plurality of points 204.

The defining at 305 may be performed with any suitable timing and/or sequence during methods 300. As examples, the defining at 305 may be performed prior to the defining at 310, prior to the overlapping at 315, prior to the positioning at 320, prior to the collecting at 325, prior to the aligning at 330, and/or prior to the adjusting at 335.

Defining operation locations at 310 may include defining a plurality of predetermined operation locations at which the plurality of operations will be performed by the end effector and/or during the executing at 355. In some examples, the defining at 310 may include defining the plurality of predetermined operation locations independent from any dimensional information of the part. In some examples, the defining at 310 may include defining the plurality of predetermined operation locations without, or independent from, any dimensional information of the part. Stated another way, the defining at 310 may include defining the plurality of predetermined operation locations without prior knowledge of the part and/or without prior knowledge of the part's dimensions. Similar to the defining at 305, such a configuration may be beneficial, for example, when methods 300 are performed on older parts, such as older aircraft, for which detailed dimensional information may not readily be available.

In some examples, the defining at 310 may include defining the plurality of predetermined operation locations based on rough measurements of the part and/or rough measurements of a desired size for the region of the part within which methods 300 will be performed. As more specific examples, the defining at 310 may include defining the plurality of predetermined operation locations based, at least in part, or based solely, upon a length of the region of the part, a width of the region of the part, a length of the part, a width of the part, one or more internal dimensions of the part, and/or one or more external dimensions of the part. When the detailed dimensional information for the part readily may be available, the defining at 310 may include defining the plurality of predetermined operation locations based, at least in part, on the detailed dimensional information for the part.

Figure 6:
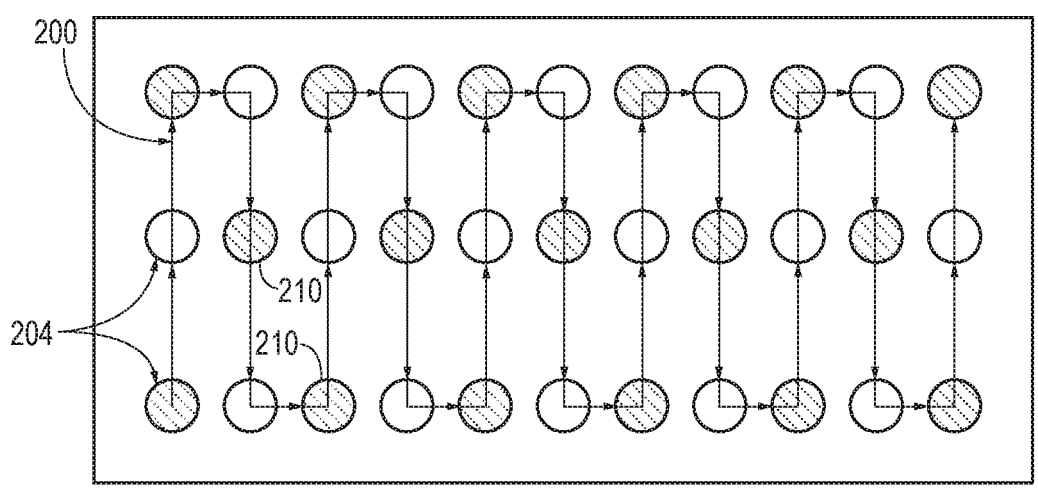
FIG. 6 is a schematic illustration of examples of a plurality of predetermined event locations within a predetermined raster scan patter, according to the present disclosure.

An example of the plurality of predetermined operation locations is illustrated in FIG. 6 and indicated at 210. As illustrated, the plurality of predetermined operation locations may include and/or may be a subset of points 204 that define the plurality of point-to-point moves of predetermined raster scan pattern 200.

The defining at 310 may be performed with any suitable timing and/or sequence during methods 300. As examples, the defining at 310 may be performed prior to the defining at 305, prior to the overlapping at 315, prior to the positioning at 320, prior to the collecting at 325, prior to the aligning at 330, and/or prior to the adjusting at 335.

In some examples, the predetermined raster scan pattern may be configured to be performed and/or carried out within a defined region in space and/or may be configured to be performed and/or carried out based upon one or more predetermined reference locations. Additionally or alternatively, the predetermined raster scan pattern may be configured to be performed and/or carried out in a predetermined direction relative to a current, or a given, location of the robot. In some such examples, methods 300 further may include overlapping the part and the predetermined raster scan pattern at 315. In some examples, the overlapping at 315 may include positioning the part such that the part is within the predetermined raster scan pattern. In some examples, the overlapping at 315 may include positioning the robot and/or the end effector such that the part is within the predetermined raster scan pattern.

The overlapping at 315 may be performed with any suitable timing and/or sequence during methods 300. As examples, the overlapping at 315 may be performed subsequent to the defining at 305, subsequent to the defining at 310, prior to the positioning at 320, subsequent to the positioning at 320, responsive to the positioning at 320, prior to the collecting at 325, prior to the aligning at 330, and/or prior to the adjusting at 335.

Positioning the part within the field-of-view of an imaging device at 320 may include moving the part, the end effector, the imaging device, and/or the robot in any suitable manner to position the part and the imaging device such that the part is in the field-of-view of the imaging device. In some examples, the predetermined raster scan pattern may extend within the field-of-view of the imaging device. In some such examples, the positioning at 320 may be responsive to and/or a result of the overlapping at 315.

The positioning at 320 may be performed with any suitable timing and/or sequence during methods 300. As examples, the positioning at 320 may be performed subsequent to the defining at 305, subsequent to the defining at 310, prior to the overlapping at 315, subsequent to the overlapping at 315, prior to the collecting at 325, prior to the aligning at 330, and/or prior to the adjusting at 335.

Collecting the spatial representation of the part at 325 may include collecting any suitable spatial representation of the part and may be performed with, via, and/or utilizing the imaging device. In some examples the spatial representation of the part may include and/or be an image of the part. Examples of the image of the part include an optical image of the part and/or an acoustic image of the part.

Figure 7:
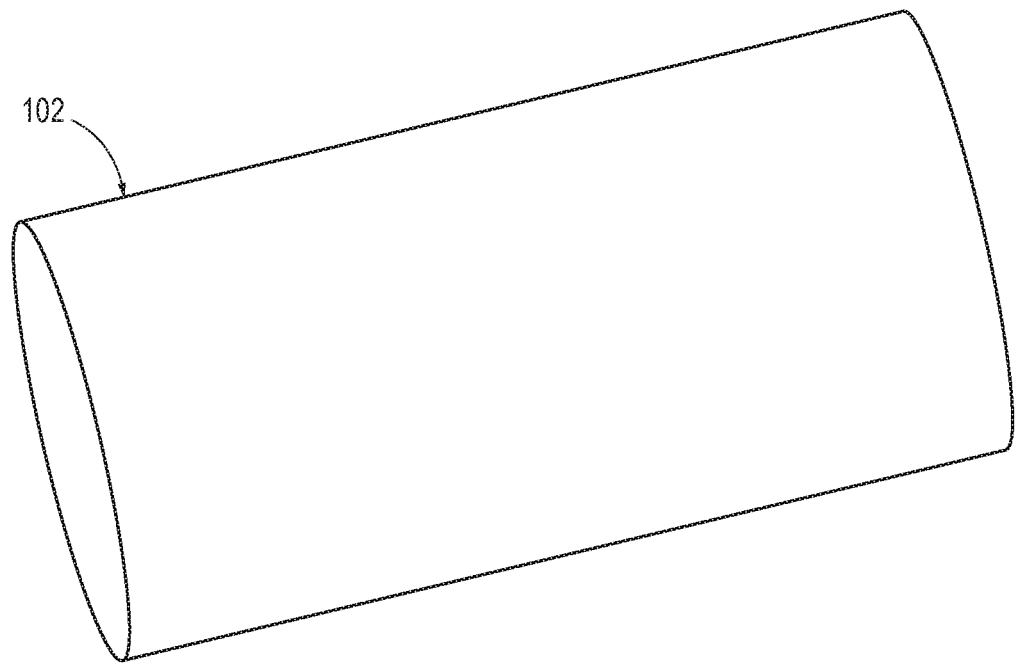
FIG. 7 is a schematic illustration of an example of a spatial representation of a part that may be utilized with the robots and methods according to the present disclosure.

An example of a spatial representation that may be collected during the collecting at 325 is schematically illustrated in FIG. 7 and indicated at 102. As illustrated, the spatial representation may include spatial information regarding the part, or a surface of the part, in three dimensions.

The collecting at 325 may be performed with any suitable timing and/or sequence during methods 300. As examples, the collecting at 325 may be performed subsequent to the defining at 305, subsequent to the defining at 310, subsequent to the overlapping at 315, subsequent to the positioning at 320, prior to the aligning at 330, prior to the adjusting at 335, prior to the defining at 340, prior to the moving at 345, prior to the orienting at 350, prior to the executing at 355, prior to the displaying at 365, and/or prior to the identifying at 370.

Aligning the predetermined raster scan pattern at 330 may include aligning the predetermined raster scan pattern, which describes movement of the end effector relative to the part, with the spatial representation of the part. The aligning at 330 may be accomplished in any suitable manner. As an example, the aligning at 330 may include physically orienting the robot, and the part, relative to one another and/or such that the predetermined raster scan pattern extends within and/or encompasses the region of the part. As anther example, the aligning at 330 may include utilizing an actuator of the robot, such as actuator 50 of FIG. 3, and/or an actuator of the end effector, such as actuator 60 of FIG. 3, to align the predetermined raster scan pattern with the spatial representation of the part. As additional examples, the aligning at 330 may include moving, translating, and/or rotating at least a portion of the robot relative to the part, moving, translating, and/or rotating at least a portion of the part relative to the robot, and/or adjusting a reference point of the predetermined raster scan pattern, such as a start location 206 for the predetermined raster scan pattern and/or an end location 208 for the predetermined raster scan pattern, which are illustrated in FIG. 8, such that the predetermined raster scan pattern encompasses the region of the part.

Figure 8:
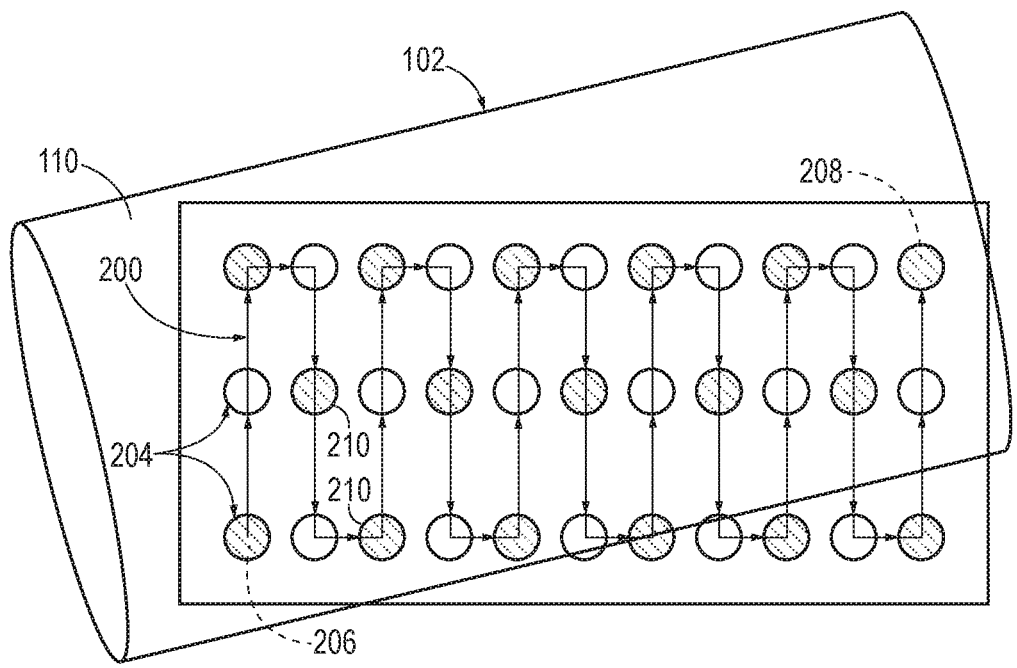
FIG. 8 is a schematic illustration an example of an initial orientation between a predetermined raster scan pattern and a spatial representation of a part, according to the present disclosure.
Figure 9:
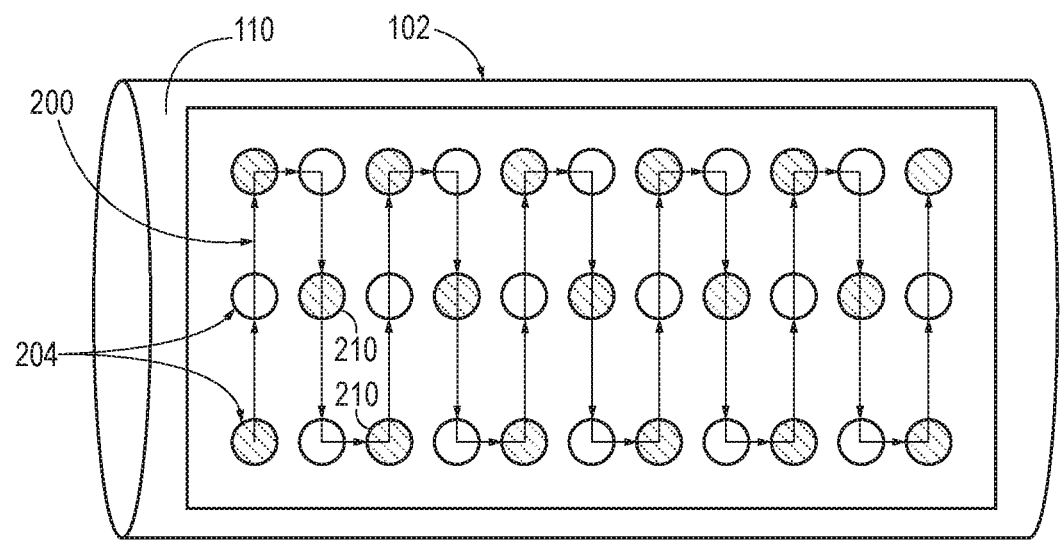
FIG. 9 illustrates an example of alignment between the predetermined raster scan pattern of FIG. 8 and the spatial representation of the part of FIG. 8.

The aligning at 330 is illustrated by the transition from FIG. 8 to FIG. 9. As illustrated in FIG. 8, and prior to the aligning at 330, predetermined raster scan pattern 200 and/or points 204 thereof may not be aligned with spatial representation 102. As an example, points 204, or all points 204, may not be positioned on and/or within spatial representation 102, which may represent region 110 of the part. However, as illustrated in FIG. 9, and subsequent to the aligning at 330, predetermined raster scan pattern 200 and/or points 204 thereof may be aligned with spatial representation 102 and/or may extend within region 110.

The aligning at 330 may be performed with any suitable timing and/or sequence during methods 300. As examples, the aligning at 330 may be performed subsequent to the defining at 305, subsequent to the defining at 310, subsequent to the overlapping at 315, subsequent to the positioning at 320, subsequent to the collecting at 325, subsequent to the adjusting at 335, concurrently with the adjusting at 335, responsive to the adjusting at 335, as a result of the adjusting at 335, prior to the adjusting at 335, prior to the defining at 340, prior to the moving at 345, prior to the orienting at 350, prior to the executing at 355, prior to the displaying at 365, and/or prior to the identifying at 370.

Adjusting the predetermined raster scan pattern at 335 may include adjusting the predetermined raster scan pattern to produce and/or generate an adjusted raster scan pattern 202 that may be based, at least in part, on the spatial representation of the part that was collected during the collecting at 325. Stated another way, the adjusting at 335 may include adjusting the predetermined raster scan pattern such that the predetermined raster scan pattern conforms to the spatial representation of the part. Stated yet another way, the adjusting at 335 may include adjusting the predetermined raster scan pattern such that the adjusted raster scan pattern extends entirely within the region of the part where the plurality of operations are to be performed. Stated another way, the adjusting at 335 may include adjusting the predetermined raster scan pattern such that the predetermined raster scan pattern is representative of, or extends within a representative region of, the spatial representation of the part. When methods 300 include the adjusting at 335, the moving at 345 may include moving the end effector relative to the part along the adjusted raster scan pattern.

The adjusting at 335 may include adjusting the predetermined raster scan pattern in any suitable manner. As an example, the adjusting at 335 may include scaling at least one portion and/or region of the predetermined raster scan pattern to produce and/or generate the adjusted raster scan pattern. As another example, the adjusting at 335 may include truncating and/or shrinking at least one portion and/or region of the predetermined raster scan pattern to produce and/or generate the adjusted raster scan pattern. As yet another example, the adjusting at 335 may include extending and/or stretching at least one portion and/or region of the predetermined raster scan pattern to produce and/or generate the adjusted raster scan pattern.

Figure 10:
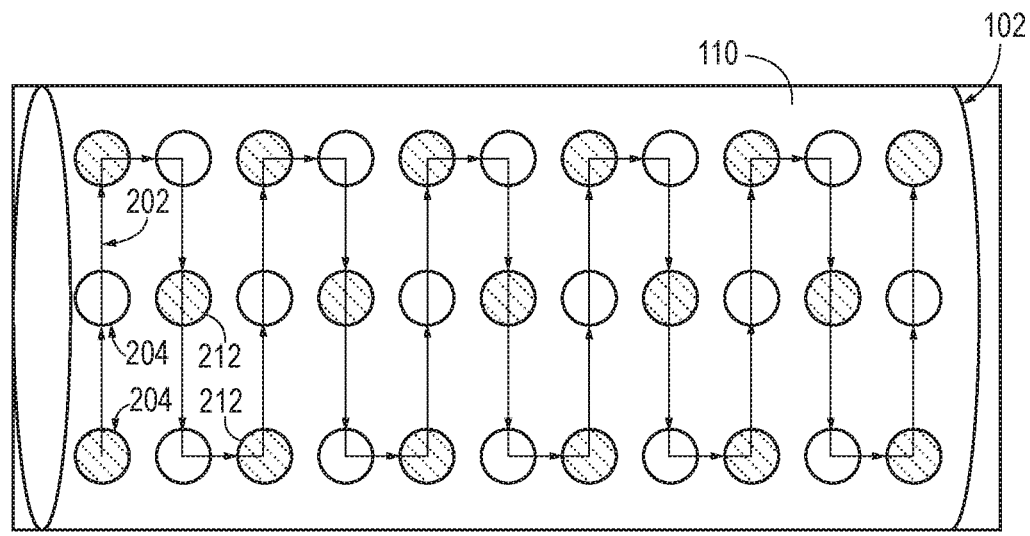
FIG. 10 is a schematic illustration of an example of an adjusted raster scan pattern, according to the present disclosure.

The adjusting at 335 is illustrated by the transition from FIG. 9 to FIG. 10. In FIG. 9, and prior to the adjusting at 335, predetermined raster scan pattern 200 is smaller than and/or does not conform entirely to region 110 of the part. In FIG. 10, and subsequent to the adjusting at 335, adjusted raster scan pattern 202 is comparable in size to region 110, more fully encompasses region 110, and/or more fully fills region 110. In the transition from FIG. 9 to FIG. 10, the adjusting at 335 includes scaling, or expanding, predetermined raster scan pattern 200 along two axes to generate adjusted raster scan pattern 202.

As illustrated by the transition from FIG. 9 to FIG. 10, a location of points 204 also may be changed and/or adjusted during the adjusting at 335 such that adjusted raster scan pattern 202 still is defined by a plurality of point-to-point moves among points 204. With this in mind, the adjusting at 335 also may be referred to herein as adjusting the plurality of points 204 and/or as adjusting the plurality of predetermined operation locations 210, such as to produce and/or generated an adjusted plurality of predetermined operation locations 212.

When methods 300 include the adjusting at 335, the defining at 340 may include defining the plurality of normality vectors at each adjusted operation location of the adjusted plurality of operation locations. Additionally or alternatively, the orienting at 350 may include orienting the end effector such that the operation device faces toward each adjusted operation location along a corresponding normality vector of the plurality of normality vectors.

The adjusting at 335 may be performed with any suitable timing and/or sequence during methods 300. As examples, the adjusting at 335 may be performed subsequent to the defining at 305, subsequent to the defining at 310, subsequent to the overlapping at 315, subsequent to the positioning at 320, subsequent to the collecting at 325, subsequent to the aligning at 330, prior to the defining at 340, prior to the moving at 345, prior to the orienting at 350, prior to the executing at 355, prior to the displaying at 365, and/or prior to the identifying at 370.

Defining the plurality of normality vectors at 340 may include defining the plurality of normality vectors for the part and/or at the plurality of predetermined operation locations. The defining at 340 may be based, at least in part, on the spatial representation of the part that was collected during the collecting at 325. As discussed, each operation location may be defined along the predetermined raster scan pattern and/or may be a selected point of a plurality of points that define the predetermined raster scan pattern.

The defining at 340 may be accomplished in any suitable manner. As an example, the defining at 340 may include quantifying a surface curvature of the part at each operation location. In some such examples, the quantifying the surface curvature may include fitting a surface to the spatial representation of the part at each operation location. In some such examples, the defining at 340 may include calculating the surface normal vector based, at least in part, on the surface curvature and/or the fitted surface at each operation location. As another example, the defining at 340 may include calculating a surface normal direction at each operation location. The defining at 340 may be performed utilizing a controller of the robot, such as controller 40 of FIG. 3, and/or utilizing a computing device that is in communication with the robot.

Figure 11:
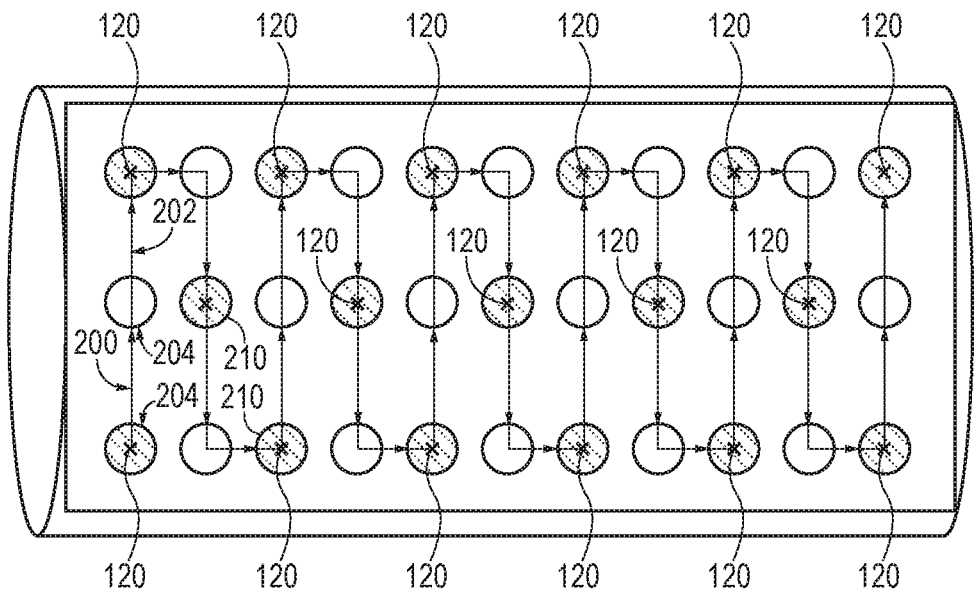
FIG. 11 is a schematic illustration of an example of a plurality of normality vectors, according to the present disclosure.
Figure 12:
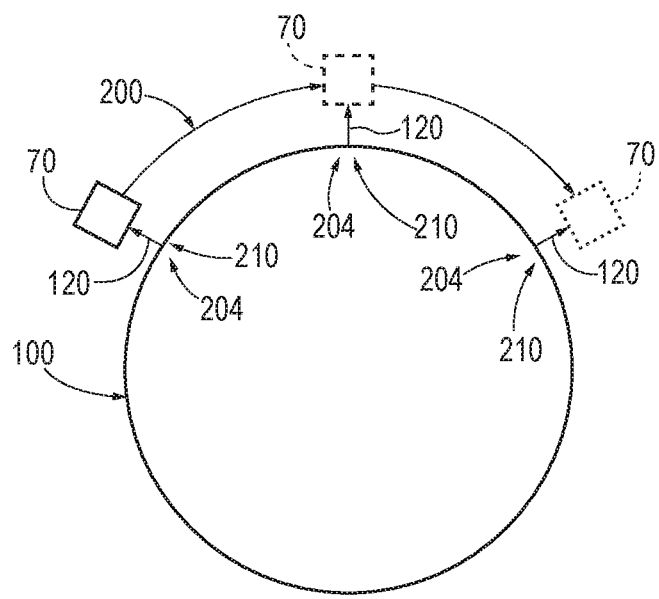
FIG. 12 is a schematic illustration of examples of motion of an end effector of a robot relative to a part while performing methods, according to the present disclosure.

The defining at 340 is illustrated in FIGS. 3, 11, and 12. FIGS. 3 and 12 illustrate a side view of normality vectors 120 at points 204 and/or predetermined operation locations 210, and FIG. 11 illustrates a top view of normality vectors 120 (illustrated as X's).

The defining at 340 may be performed with any suitable timing and/or sequence during methods 300. As examples, the defining at 340 may be performed subsequent to the defining at 305, subsequent to the defining at 310, subsequent to the overlapping at 315, subsequent to the positioning at 320, subsequent to the collecting at 325, subsequent to the aligning at 330, subsequent to the adjusting at 335, prior to the moving at 345, prior to the orienting at 350, prior to the executing at 355, prior to the displaying at 365, and/or prior to the identifying at 370.

Moving the end effector at 345 may include moving the end effector relative to the part and/or along the predetermined raster scan pattern. In some examples, the moving at 345 may include performing a plurality of point-to-point moves with the end effector and/or along the predetermined raster scan pattern. In some examples, a length of each point-to-point move may be relatively small. As examples, the length of each point-to-point move may be at least 0.1 millimeter (mm), at least 0.2 mm, at least 0.4 mm, at least 0.6 mm, at least 0.8 mm, at least 1 mm, at least 1.2 mm, at least 1.4 mm, at least 1.6 mm, at least 1.8 mm, at least 2 mm, at least 2.2 mm, at least 2.4 mm, at least 2.6 mm, at least 2.8 mm, at least 3 mm, at least 4 mm, at least 5 mm, at least 6 mm, at least 8 mm, at least 10 mm, at least 15 mm, at least 20 mm, at least 25 mm, at most 100 mm, at most 90 mm, at most 80 mm, at most 70 mm, at most 60 mm, at most 50 mm, at most 40 mm, at most 30 mm, at most 25 mm, at most 20 mm, at most 15 mm, at most 10 mm, at most 5 mm, and/or at most 2.5 mm. Such a short distance between successive point-to-point moves may provide a large number of locations for the plurality of operations to be performed and/or may provide a high resolution for the plurality of operations within the region of the part.

Stated another way, and when the plurality of operations includes a plurality of sampling events and/or measurements, examples of which are disclosed herein, the short distance between successive point-to-point moves may permit and/or facilitate improved measurement resolution. Stated yet another way, and when the plurality of operations includes a plurality of modifications to the part, examples of which are disclosed herein, the short distance between successive point-to-point moves may permit and/or facilitate more uniform modification to the part, may provide a greater number of options regarding where, on the part, the modifications may be performed, and/or may provide a greater number of options regarding spacing between adjacent modifications.

The moving at 345 is illustrated in FIG. 11 by the arrows illustrating the path taken for predetermined raster scan pattern 200. The moving at 345 also is illustrated in FIG. 12 by the transition from the configuration illustrated in solid lines to the configuration illustrated in dashed lines to the configuration illustrated in dotted lines, with the progression of these configurations occurring along predetermined raster scan pattern 200.

The moving at 345 may be accomplished in any suitable manner. As an example, the moving at 345 may be accomplished with, via, and/or utilizing an actuator of the robot and/or an actuator of the end effector, examples of which are disclosed herein.

In some examples of methods 300, the moving at 345 may include continuously, or at least substantially continuously, moving the end effector along the predetermined raster scan pattern, at least until the end effector traverses an entirety of the predetermined raster scan pattern. Stated another way, and subsequent to initiating the moving at 345, methods 300 may include continuously, or at least substantially continuously moving the end effector along the predetermined raster scan pattern until the end effector has moved along the entire raster scan pattern.

In some examples of methods 300, the moving at 345 may include intermittently moving the end effector along the predetermined raster scan pattern. As an example, the moving at 345 may include moving the end effector along the predetermined raster scan pattern until the end effector reaches a given operation location of the plurality of operation locations. Upon reaching the given operation location, the end effector may stop at the given operation location, such as to permit the end effector to perform the corresponding operation at the given operation location.

The moving at 345 may be performed with any suitable timing and/or sequence during methods 300. As examples, the moving at 345 may be performed subsequent to the defining at 305, subsequent to the defining at 310, subsequent to the overlapping at 315, subsequent to the positioning at 320, subsequent to the collecting at 325, subsequent to the aligning at 330, subsequent to the adjusting at 335, subsequent to the defining at 340, prior to the orienting at 350, during the orienting at 350, at least partially concurrently with the orienting at 350, prior to the executing at 355, prior to the displaying at 365, and/or prior to the identifying at 370.

Orienting the end effector at 350 may be performed at each operation location of the plurality of predetermined operation locations and/or along the predetermined raster scan pattern. The orienting at 350 may include orienting the end effector such that the operation device of the end effector faces toward each operation location along a corresponding normality vector of the plurality of normality vectors. Stated another way, the orienting at 350 includes aligning the operation device along the corresponding normality vector at each operation location. As discussed in more detail herein, such a configuration may improve an efficiency of, an effectiveness of, a reproducibility of, and/or a uniformity of the corresponding operation that is performed at each operation location.

The orienting at 350 may be performed in any suitable manner. As an example, the orienting at 350 may include operatively translating the operation device, such as relative to the part, in at least one, at least two, or three orthogonal directions. As another example, the orienting at 350 may include operatively rotating the operating device, such as relative to the part, about at least one, at least two, or three orthogonal axes.

In some examples, the orienting at 350 may include establishing a predetermined device-to-part distance between the operation device and the part. In some examples, the establishing the predetermined device-to-part distance may include establishing a spaced-apart relationship between the operation device and the part. In some examples, the predetermined device-to-part distance may be constant, or at least substantially constant, at each operation location. In some examples, a first predetermined device-to-part distance associated with a first operation location of the plurality of operation locations may differ from a second predetermined device-to-part distance associated with a second operation location of the plurality of operation locations.

The orienting at 350 may be accomplished in any suitable manner. As examples, the orienting at 350 may be performed utilizing the actuator of the robot and/or utilizing the actuator of the end effector.

The orienting at 350 is illustrated in FIG. 12. As illustrated therein, at each predetermined operation location 210, operation device 70 is oriented, relative to part 100, such that the operation device faces toward the part along a corresponding normality vector 120. FIG. 12 also illustrates a configuration in which the predetermined device-to-part distance is constant, or at least substantially constant, at each predetermined operation location 210.

The orienting at 350 may be performed with any suitable timing and/or sequence during methods 300. As examples, the orienting at 350 may be performed subsequent to the defining at 305, subsequent to the defining at 310, subsequent to the overlapping at 315, subsequent to the positioning at 320, subsequent to the collecting at 325, subsequent to the aligning at 330, subsequent to the adjusting at 335, subsequent to the defining at 340, subsequent to the moving at 345, during the moving at 345, at least partially concurrently with the moving at 345, prior to the executing at 355, prior to the displaying at 365, and/or prior to the identifying at 370.

Executing the corresponding operation at 355 may be performed at each operation location of the plurality of predetermined operation locations and/or along the predetermined raster scan pattern. The executing at 355 may include executing a corresponding operation of the plurality of operations with, via, and/or utilizing the operation device. The plurality of operations may include and/or be any suitable operation that may be performed on the part and/or by the operation device. In some examples, the plurality of operations may include a plurality of measurements of the part. In such examples, the measurements of the part and/or a reproducibility of the measurements of the part may be improved by the orienting at 350. Examples of the plurality of measurements of the part include evaluating the part, performing a non-destructive test on the part, performing a non-contact inspection of the part, performing an ultrasound evaluation of the part, performing an infrared evaluation of the part, and/or performing an optical evaluation of the part.

In some examples, the plurality of operations may include a plurality of modifications to the part. In such examples, the modifications to the part, a reproducibility of the modifications to the part, and/or a uniformity of the modifications to the part may be improved by the orienting at 350. Examples of the plurality of modifications to the part include painting the part, sanding the part, machining the part, and/or drilling holes in the part.

In a specific example, the executing at 355 may include performing an ultrasound inspection of the part, such as at each operation location. In such examples, the operation device may include and/or be an ultrasound device. In some such examples, the executing at 355 may include initiating an ultrasonic vibration in the part at each operation location and detecting an emitted ultrasonic vibration emitted from the part at each operation location. The initiating may be performed in any suitable manner, such as utilizing any suitable laser ultrasound device and/or mechanical actuator.

In some such examples, the initiating the ultrasonic vibration may include initiating with a laser of the operation device. In some such examples, the orienting at 350 may include positioning a focal point of the laser within each operation location and/or directing the laser incident upon the part along the corresponding normality vector. In some such examples, the detecting the emitted ultrasonic vibration may include detecting with an ultrasonic detector. In some such examples, the orienting at 350 may include positioning the ultrasonic detector along the corresponding normality vector and/or positioning the ultrasonic detector such that the emitted ultrasonic vibration is incident upon the ultrasonic detector from the corresponding normality direction.

The plurality of operation locations may include any suitable portion, fraction, and/or subset of the plurality of points that defines the plurality of point-to-point moves of the predetermined raster scan pattern. Examples of the subset of the plurality of points include at least 1%, at least 5%, at least 10%, at least 20%, at least 30%, at least 40%, at least 50%, at least 60%, at least 70%, at least 80%, at least 90%, at least 95%, at least 99%, 100%, at most 100%, at most 90%, at most 80%, at most 70%, at most 60%, at most 50%, at most 40%, at most 30%, at most 20%, and/or at most 10% of the plurality of points.

Triggering the inspection device at 360 may include triggering any suitable inspection device, examples of which are disclosed herein. The triggering at 360 may include generating a trigger event, such as may indicate that the event device is at a corresponding predetermined operation location and/or that the event device is oriented along the corresponding normality vector. The triggering at 360 also may include providing the trigger event to the inspection device, such as to indicate to the inspection device that an inspection is to be performed. The triggering at 360 also may include performing an inspection with the inspection device, such as responsive to receipt of the trigger event.

The triggering at 360 may include triggering with, via, and/or utilizing any suitable trigger methodology and/or algorithm. This may include any suitable predetermined trigger algorithm, which may be utilized to establish and/or determine the plurality of operation locations. When methods 300 include the adjusting at 335, the adjusting at 335 further may include adjusting the predetermined trigger algorithm. As an example, the predetermined trigger algorithm may indicate a fixed number of trigger events. In this example, the adjusting may include scaling a location of the trigger events in a manner that may be similar to the scaling of the predetermined raster scan pattern. As another example, the predetermined trigger algorithm may indicate a fixed distance between trigger events. In this example, the adjusting may include increasing a number of trigger events performed along a given axis responsive to an increase in a size of the predetermined raster scan pattern along the given axis and/or decreasing the number of trigger events performed along the give axis responsive to a decrease in the size of the predetermined raster scan pattern along the given axis.

Displaying displayed information at 365 may include displaying any suitable information, such as to an operator of the robot, that may be obtained via methods 300 and/or that may be produced as a result of methods 300. As an example, and when the executing at 355 includes performing the ultrasound inspection, the displaying at 365 may include displaying displayed information that may be based, at least in part, on the emitted ultrasonic vibration emitted from the part at each operation location. Examples of such displayed information include an A-scan at a location on the part, a B-scan along a line on the part, a C-scan of an area the part, and/or a three dimensional or Voxel-based ultrasonic display, image, or volumetric image of the part.

Identifying the part characteristic at 370 may include identifying any suitable part characteristic based, at least in part, on the displaying at 365. As examples, the identifying at 370 may include identifying a defect in the part, damage to the part, degradation of the part, a physical dimension of the part, and/or a coating thickness of a coating that coats the part.

Illustrative, non-exclusive examples of inventive subject matter according to the present disclosure are described in the following enumerated paragraphs:

A1. A method of performing a plurality of operations within a region of a part utilizing an end effector of a robot, the method comprising:

collecting, with an imaging device associated with the robot, a spatial representation of the part;

aligning a predetermined raster scan pattern for movement of the end effector relative to the part with the spatial representation of the part;

defining a plurality of normality vectors for the part at a plurality of predetermined operation locations for operation of the end effector, wherein the defining is based, at least in part, on the spatial representation of the part, and further wherein each operation location of the plurality of predetermined operation locations is defined along the predetermined raster scan pattern;

moving the end effector relative to the part and along the predetermined raster scan pattern; and at each operation location:

(i) orienting the end effector such that an operation device of the end effector faces toward each operation location along a corresponding normality vector of the plurality of normality vectors; and (ii) executing, with the operation device, a corresponding operation of the plurality of operations.

A2. The method of paragraph A1, wherein the collecting the spatial representation of the part includes collecting an image of the part.

A3. The method of paragraph A2, wherein the image of the part includes at least one of:

(i) an optical image of the part; and (ii) an acoustic image of the part.

A4. The method of any of paragraphs A1-A3, wherein the imaging device includes at least one of:

(i) a camera;

(ii) a still camera;

(iii) a video camera;

(iv) an infrared imaging device;

(v) a laser-based imaging device;

(vi) a 3-dimensional imaging device; and (vii) an acoustic imaging device.

A5. The method of any of paragraphs A1-A4, wherein the aligning includes physically orienting the robot and the part, relative to one another, such that the predetermined raster scan pattern encompasses the region of the part.

A6. The method of any of paragraphs A1-A5, wherein the aligning includes at least one of:

(i) moving at least a portion of the robot relative to the part; and (ii) moving at least a portion of the part relative to the robot.

A7. The method of any of paragraphs A1-A6, wherein the aligning includes adjusting a reference point of the predetermined raster scan pattern such that the predetermined raster scan pattern encompasses the region of the part.

A8. The method of any of paragraphs A1-A7, wherein the aligning is performed at least one of:

(i) utilizing an actuator of the robot; and (ii) utilizing an actuator of the end effector.

A9. The method of any of paragraphs A1-A8, wherein the defining the plurality of normality vectors includes quantifying a surface curvature of the part at each operation location.

A10. The method of any of paragraphs A1-A9, wherein the defining the plurality of normality vectors includes calculating a surface normal direction at each operation location.

A11. The method of any of paragraphs A1-A10, wherein the defining is performed at least one of:

(i) utilizing a controller of the robot; and (ii) utilizing a computing device that is in communication with the robot.

A12. The method of any of paragraphs A1-A11, wherein the moving includes performing a plurality of point-to-point moves with the end effector and along the predetermined raster scan pattern.

A13. The method of paragraph A12, wherein a length of each point-to-point move is at least one of:

(i) at least 0.1 millimeter (mm), at least 0.2 mm, at least 0.4 mm, at least 0.6 mm, at least 0.8 mm, at least 1 mm, at least 1.2 mm, at least 1.4 mm, at least 1.6 mm, at least 1.8 mm, at least 2 mm, at least 2.2 mm, at least 2.4 mm, at least 2.6 mm, at least 2.8 mm, at least 3 mm, at least 4 mm, at least 5 mm, at least 6 mm, at least 8 mm, at least 10 mm, at least 15 mm, at least 20 mm, or at least 25 mm; and (ii) at most 100 mm, at most 90 mm, at most 80 mm, at most 70 mm, at most 60 mm, at most 50 mm, at most 40 mm, at most 30 mm, at most 25 mm, at most 20 mm, at most 15 mm, at most 10 mm, at most 5 mm, or at most 2.5 mm.

A14. The method of any of paragraphs A1-A13, wherein the moving is performed at least one of:

(i) utilizing an/the actuator of the robot; and (ii) utilizing an/the actuator of the end effector.

A15. The method of any of paragraphs A1-A14, wherein the orienting is performed during the moving.

A15.1 The method of any of paragraphs A1-A15, wherein the orienting includes operatively translating the operation device in at least one direction, optionally in at least two orthogonal directions, and further optionally in three orthogonal directions.

A16. The method of any of paragraphs A1-A15.1, wherein the orienting includes operatively rotating the operation device about at least one axis, optionally at least two orthogonal axes, and further optionally three orthogonal axes.

A17. The method of any of paragraphs A1-A16, wherein the orienting includes establishing a predetermined device-to-part distance between the operation device and the part.

A18. The method of paragraph A17, wherein the predetermined device-to-part distance is constant, or at least substantially constant, at each operation location.

A19. The method of any of paragraphs A17-A18, wherein a first predetermined device-to-part distance associated with a first operation location of the plurality of operation locations differs from a second predetermined device-to-part distance associated with a second operation location of the plurality of operation locations.

A20. The method of any of paragraphs A1-A19, wherein the orienting is performed at least one of:

(i) utilizing an/the actuator of the robot; and (ii) utilizing an/the actuator of the end effector.

A21. The method of any of paragraphs A1-A20, wherein the executing is performed during the moving.

A21.1 The method of any of paragraphs A1-A21, wherein the plurality of operations includes at least one of:

(i) evaluating the part;

(ii) performing a non-destructive test on the part;

(iii) performing a non-contact inspection of the part;

(iv) painting the part;

(v) sanding the part;

(vi) performing an ultrasound evaluation of the part;

(vii) performing an infrared evaluation of the part; and (viii) performing an optical evaluation of the part.

A22. The method of any of paragraphs A1-A21.1, wherein the operation device includes at least one of:

(i) a transducer;

(ii) a sensor;

(iii) a non-destructive tester;

(iv) a non-contact inspection device;

(v) a painting device;

(vi) a sanding device;

(vii) an ultrasound transmitter;

(viii) an ultrasound receiver;

(ix) an infrared transmitter;

(x) an infrared receiver; and (xi) an optical imaging device.

A23. The method of any of paragraphs A1-A22, wherein the executing the corresponding operation includes performing an ultrasound inspection of the part at each operation location, optionally wherein the operation device includes an ultrasound device.

A24. The method of paragraph A23, wherein the executing the operation further includes:

(i) initiating an ultrasonic vibration in the part at each operation location; and (ii) detecting an emitted ultrasonic vibration emitted from the part at each operation location.

A25. The method of paragraph A24, wherein the initiating the ultrasonic vibration includes initiating with a laser of the operation device, and further wherein the orienting includes positioning a focal point of the laser within each operation location.

A26. The method of any of paragraphs A24-A25, wherein the detecting the emitted ultrasonic vibration includes detecting with an ultrasonic detector, and further wherein the orienting includes positioning the ultrasonic detector along the corresponding normality vector.

A27. The method of any of paragraphs A24-A26, wherein the method further includes displaying displayed information that is based upon the emitted ultrasonic vibration emitted from the part at each operation location.

A28. The method of paragraph A27, wherein the display information includes at least one of:

(i) an A-scan of the part;

(ii) a B-scan of the part;

(iii) a C-scan of the part; and (iv) a three-dimensional volumetric image of the part.

A29. The method of any of paragraphs A27-A28, wherein, based, at least in part on the displaying, the method further includes identifying at least one of:

(i) a defect in the part;

(ii) damage to the part;

(iii) degradation of the part;

(iv) a physical dimension of the part; and (v) a coating thickness of a coating that coats the part.

A29.1 The method of any of paragraphs A1-A29, wherein, at each operation location, the method further includes generating a trigger event.

A29.2 The method of paragraph A29.1, wherein the method further includes providing the trigger event to an inspection device, optionally of the end effector.

A29.3 The method of paragraph A29.2, wherein, responsive to receipt of the trigger event, the method further includes performing an inspection with the inspection device.

A30. The method of any of paragraphs A1-A29.3, wherein, prior to the collecting, the method further includes defining the predetermined raster scan pattern.

A31. The method of paragraph A30, wherein the defining the predetermined raster scan pattern includes defining the predetermined raster scan pattern independent from any dimensional information of the part.

A32. The method of any of paragraphs A30-A31, wherein the defining the predetermined raster scan pattern includes defining the predetermined raster scan pattern based, at least in part, and optionally based solely upon, on at least one of a length of the region and a width of the region.

A33. The method of any of paragraphs A30-A32, wherein the defining the predetermined raster scan pattern includes defining the predetermined raster scan pattern based upon detailed dimensional information of the part.

A34. The method of any of paragraphs A1-A33, wherein the plurality of predetermined operation locations includes a subset of a plurality of points that defines a/the plurality of point-to-point moves of the predetermined raster scan pattern.

A35. The method of paragraph A34, wherein the subset of the plurality of points includes at least one of:
(i) at least 1%, at least 5%, at least 10%, at least 20%, at least 30%, at least 40%, at least 50%, at least 60%, at least 70%, at least 80%, at least 90%, at least 95%, at least 99%, or 100% of the plurality of points; and
(ii) at most 100%, at most 90%, at most 80%, at most 70%, at most 60%, at most 50%, at most 40%, at most 30%, at most 20%, or at most 10% of the plurality of points.

A36. The method of any of paragraphs A1-A29, wherein, prior to the collecting, the method further includes defining the plurality of predetermined operation locations.

A37. The method of paragraph A36, wherein the defining the plurality of predetermined operation locations includes defining the plurality of predetermined operation locations independent from any dimensional information of the part.

A38. The method of any of paragraphs A36-A37, wherein the defining the plurality of predetermined operation locations includes defining the plurality of predetermined operation locations based, at least in part, and optionally based solely upon, on at least one of a length of the region and a width of the region.

A39. The method of any of paragraphs A36-A38, wherein the defining the plurality of predetermined operation locations includes defining the plurality of predetermined operation locations based upon detailed dimensional information of the part.

A40. The method of any of paragraphs A1-A39, wherein, prior to the collecting the spatial representation of the part, the method further includes overlapping the part and the predetermined raster scan pattern.

A41. The method of paragraph A40, wherein the overlapping includes at least one of:
(i) positioning the part such that the part is within the predetermined raster scan pattern; and
(ii) positioning the end effector such that the part is within the predetermined raster scan pattern.

A42. The method of any of paragraphs A1-A41, wherein, prior to the collecting the spatial representation of the part, the method further includes positioning the part within a field-of-view of the imaging device.

A43. The method of any of paragraphs A1-A42, wherein, subsequent to the collecting the spatial representation of the part and prior to the moving, the method further includes adjusting the predetermined raster scan pattern to generate an adjusted raster scan pattern, wherein the adjusted raster scan pattern is based, at least in part, on the spatial representation of the part, and further wherein the moving includes moving the end effector relative to the part and along the adjusted raster scan pattern.

A44. The method of paragraph A43, wherein the adjusting the predetermined raster scan pattern includes at least one of:
(i) scaling at least one portion of the predetermined raster scan pattern;
(ii) truncating at least one portion of the predetermined raster scan pattern; and
(iii) extending at least one portion of the predetermined raster scan pattern.

A45. The method of any of paragraphs A43-A44, wherein the method further includes adjusting the plurality of predetermined operation locations based, at least in part, on the adjusted raster scan pattern, to generate an adjusted plurality of operation locations.

A46. The method of paragraph A45, wherein the adjusting the plurality of predetermined operation locations includes adjusting such that the adjusted plurality of operation locations is defined along the adjusted raster scan pattern.

A47. The method of any of paragraphs A45-A46, wherein:
(i) the defining the plurality of normality vectors includes defining the plurality of normality vectors at each adjusted operation location of the adjusted plurality of operation locations; and
(ii) the orienting includes orienting the end effector such that the operation device faces toward each adjusted operation location along a corresponding normality vector of the plurality of normality vectors.

A48. The method of any of paragraphs A1-A47, wherein the part includes at least a portion of at least one of:
(i) an aircraft;
(ii) a wing of the aircraft;
(iii) a fuselage of the aircraft; and
(iv) a tail of the aircraft.

B1. A robot configured to perform a plurality of operations within a region of a part, the robot comprising:
an end effector, wherein the end effector includes an operation device configured to perform the plurality of operations;
an imaging device; and
a controller programmed to control the operation of the robot according to the method of any of paragraphs A1-A48.

C1. Non-transitory computer readable storage media including computer-executable instructions that, when executed, direct a robot to perform the method of any of paragraphs A1-A48.

D1. The use of a robot, which includes an end effector, an imaging device, and an operation device, to perform a plurality of operations within a region of a part without detailed prior dimensional information about the part.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A method of performing a plurality of operations within a region of a part utilizing an end effector of a robot, the method comprising:
   collecting, with an imaging device associated with the robot, a spatial representation of the part;
   aligning a predetermined raster scan pattern for movement of the end effector relative to the part with the spatial representation of the part;
   defining a plurality of normality vectors for the part at a plurality of predetermined operation locations for operation of the end effector, wherein the defining is based, at least in part, on the spatial representation of the part, and further wherein each operation location of the plurality of predetermined operation locations is defined along the predetermined raster scan pattern;
   moving the end effector relative to the part and along the predetermined raster scan pattern;
   at each operation location:
      (i) orienting the end effector such that an operation device of the end effector faces toward each operation location along a corresponding normality vector of the plurality of normality vectors; and
      (ii) executing, with the operation device, a corresponding operation of the plurality of operations.

2. The method of claim 1, wherein the collecting the spatial representation of the part includes collecting an image of the part.

3. The method of claim 1, wherein the aligning includes at least one of:
   (i) physically orienting the robot and the part, relative to one another, such that the predetermined raster scan pattern encompasses the region of the part; and
   (ii) adjusting a reference point of the predetermined raster scan pattern such that the predetermined raster scan pattern encompasses the region of the part.

4. The method of claim 1, wherein the defining the plurality of normality vectors includes at least one of:
   (i) quantifying a surface curvature of the part at each operation location; and
   (ii) calculating a surface normal direction at each operation location.

5. The method of claim 1, wherein the moving includes performing a plurality of point-to-point moves with the end effector and along the predetermined raster scan pattern.

6. The method of claim 5, wherein a length of each point-to-point move is at most 10 mm.

7. The method of claim 1, wherein the orienting includes at least one of:
   (i) operatively translating the operation device in at least one direction; and
   (ii) operatively rotating the operation device about at least one axis.

8. The method of claim 1, wherein the orienting includes establishing a predetermined device-to-part distance between the operation device and the part, wherein at least one of:
   (i) the predetermined device-to-part distance is constant, or at least substantially constant, at each operation location; and
   (ii) a first predetermined device-to-part distance associated with a first operation location of the plurality of predetermined operation locations differs from a second predetermined device-to-part distance associated with a second operation location of the plurality of predetermined operation locations.

9. The method of claim 1, wherein the plurality of operations includes at least one of:
(i) evaluating the part;
(ii) performing a non-destructive test on the part;
(iii) performing a non-contact inspection of the part;
(iv) painting the part;
(v) sanding the part;
(vi) performing an ultrasound evaluation of the part;
(vii) performing an infrared evaluation of the part; and
(viii) performing an optical evaluation of the part.

10. The method of claim 1, wherein the executing the corresponding operation includes performing an ultrasound inspection of the part at each operation location by:
(i) initiating an ultrasonic vibration in the part at each operation location; and
(ii) detecting an emitted ultrasonic vibration emitted from the part at each operation location.

11. The method of claim 10, wherein the initiating the ultrasonic vibration includes initiating with a laser of the operation device, and further wherein the orienting includes positioning a focal point of the laser within each operation location.

12. The method of claim 10, wherein the detecting the emitted ultrasonic vibration includes detecting with an ultrasonic detector, and further wherein the orienting includes positioning the ultrasonic detector along the corresponding normality vector.

13. The method of claim 10, wherein the method further includes displaying displayed information that is based upon the emitted ultrasonic vibration emitted from the part at each operation location.

14. The method of claim 13, wherein, based, at least in part on the displaying, the method further includes identifying at least one of:
(i) a defect in the part;
(ii) damage to the part;
(iii) degradation of the part;
(iv) a physical dimension of the part; and
(v) a coating thickness of a coating that coats the part.

15. The method of claim 1, wherein, prior to the collecting, the method further includes defining the predetermined raster scan pattern, wherein the defining the predetermined raster scan pattern includes defining the predetermined raster scan pattern at least one of:
(i) independent from any dimensional information of the part;
(ii) based, at least in part, on at least one of a length of the region and a width of the region; and
(iii) based upon detailed dimensional information of the part.

16. The method of claim 1, wherein the plurality of predetermined operation locations includes a subset of a plurality of points that defines a plurality of point-to-point moves of the predetermined raster scan pattern.

17. The method of claim 1, wherein, prior to the collecting, the method further includes defining the plurality of predetermined operation locations, wherein the defining the plurality of predetermined operation locations includes defining the plurality of predetermined operation locations at least one of:
(i) independent from any dimensional information of the part;
(ii) based, at least in part, on at least one of a length of the region and a width of the region; and
(iii) based upon detailed dimensional information of the part.

18. The method of claim 1, wherein, subsequent to the collecting the spatial representation of the part and prior to the moving, the method further includes adjusting the predetermined raster scan pattern to generate an adjusted raster scan pattern, wherein the adjusted raster scan pattern is based, at least in part, on the spatial representation of the part, and further wherein the moving includes moving the end effector relative to the part and along the adjusted raster scan pattern.

19. The method of claim 1, wherein the part includes at least a portion of at least one of:
(i) an aircraft;
(ii) a wing of the aircraft;
(iii) a fuselage of the aircraft; and
(iv) a tail of the aircraft.

20. A robot configured to perform a plurality of operations within a region of a part, the robot comprising:
an end effector, wherein the end effector includes an operation device configured to perform the plurality of operations;
an imaging device; and
a controller programmed to control the operation of the robot by:
collecting, with the imaging device, a spatial representation of the part;
aligning a predetermined raster scan pattern for movement of the end effector relative to the part with the spatial representation of the part;
defining a plurality of normality vectors for the part at a plurality of predetermined operation locations for operation of the end effector, wherein the defining is based, at least in part, on the spatial representation of the part, and further wherein each operation location of the plurality of predetermined operation locations is defined along the predetermined raster scan pattern;
moving the end effector relative to the part and along the predetermined raster scan pattern; and
at each operation location:
(i) orienting the end effector such that the operation device faces toward each operation location along a corresponding normality vector of the plurality of normality vectors; and
(ii) executing, with the operation device, a corresponding operation of the plurality of operations.

* * * * *